(12) United States Patent
Barker et al.

(10) Patent No.: US 6,291,097 B1
(45) Date of Patent: *Sep. 18, 2001

(54) GRID PLACEMENT IN LITHIUM ION BI-CELL COUNTER ELECTRODES

(75) Inventors: Jeremy Barker; Wade Guindy; Howard Kisner, all of Henderson; Porter Mitchell; Mohammad Parsian, both of Las Vegas, all of NV (US)

(73) Assignees: Valence Technology, Inc., Henderson, NV (US); Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,006

(22) Filed: May 11, 2000

Related U.S. Application Data

(63) Continuation of application No. 09/079,919, filed on May 15, 1998, now Pat. No. 6,063,519.

(51) Int. Cl.[7] .............. H01M 2/26; H01M 4/64
(52) U.S. Cl. .......... 429/161; 429/162; 429/122; 429/127; 429/233; 429/237; 429/210; 429/239
(58) Field of Search ................. 429/161, 162, 429/122, 127, 233, 237, 210, 239

(56) References Cited

U.S. PATENT DOCUMENTS 5,587,253  12/1996  Gozdz et al. .
5,840,087  11/1998  Gozdz et al. .
6,063,519  * 5/2000  Barker et al. .............. 429/161

FOREIGN PATENT DOCUMENTS 0 602 976 A1  6/1994  (EP) .
0 642 186 A1  3/1995  (EP) .
0771040A2   5/1997  (EP) .
WO 97/08769  3/1997  (WO) .

OTHER PUBLICATIONS

International Search Report Aug. 31, 1999.

* cited by examiner

*Primary Examiner*—Gabrielle Brouillette
*Assistant Examiner*—Angela J. Martin
(74) *Attorney, Agent, or Firm*—Harness, Dickey & Pierce, P.L.C.

(57) ABSTRACT

Disclosed herein is a battery design for bi-cell polymer matrix batteries. Each bi-cell comprises, sequentially, a first counter electrode, a first separator membrane, a centrally located electrode, a second separator membrane, and a second counter electrode. The current collector of each of the counter electrodes is positioned other than medially within the counter electrode. Generally, the current collector of the counter electrode is located within the outer half of the counter electrode. When the current collector is located at the extreme outer edge of the counter electrode, a capping film of polymer matrix material is preferably laminated to the perforated current collector, and, through the perforated current collector, to the counter electrode material itself.

25 Claims, 7 Drawing Sheets

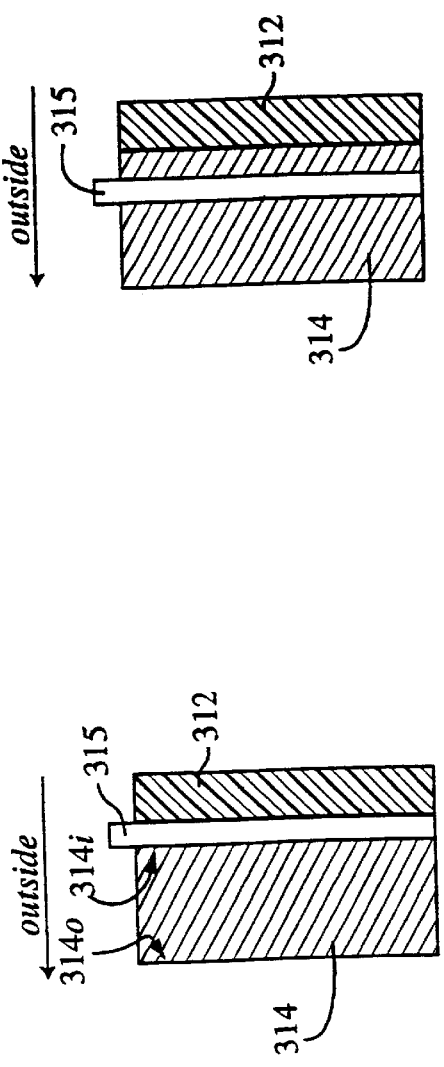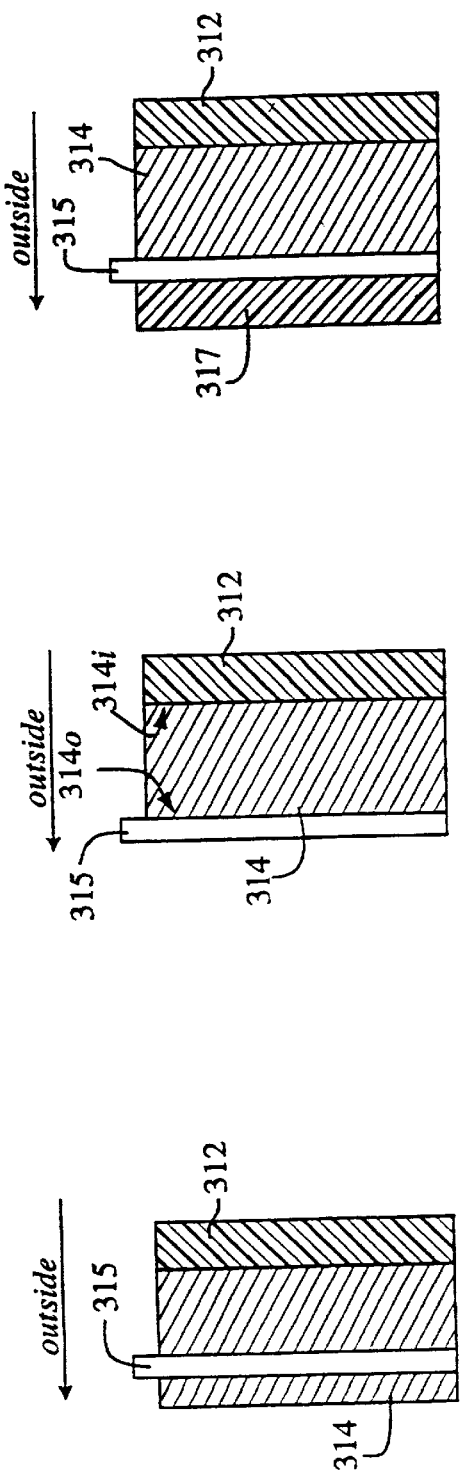

GRID PLACEMENT IN LITHIUM ION BI-CELL COUNTER ELECTRODES

CROSS-REFERENCE TO RELATED APPLICATIONS

This application is a continuation of U.S. patent application Ser. No. 09/079,919 filed May 15, 1998, now U. S. Pat. No. 6,063,519, and is related to U.S. patent application Ser. No. 09/080,144 now abandoned. Each of the related applications was filed on a date even herewith. The disclosure of each of the related applications is incorporated herein in its entirety.

TECHNICAL FIELD

This invention relates generally to batteries comprising one or an integrated series of polymer matrix bi-cell batteries. Each individual bi-cell comprises, sequentially, a first counter electrode, a film separator, a central electrode, a film separator, and a second counter electrode.

BACKGROUND OF THE INVENTION

A lithium ion electrolytic cell, such as a rechargeable lithium ion battery, is commonly constructed by means of the lamination of electrode and separator film cell elements which are individually prepared. Each of the electrodes and the film separator is formed individually, for example by coating, extrusion, or otherwise, from compositions including binder materials and a plasticizer.

Lithium ion electrolytic cells 101 may be of the traditional type, shown in FIG. 1, with an cathode 110, a separator 112, and an anode 114 sandwiched together.

A separator is positioned between a negative electrode and a positive electrode. The anode, separator, and cathode structures are then laminated to produce a standard unitary flexible electrolytic cell precursor structure. The precursor can be extracted and activated with electrolyte to form a functional battery.

A lithium ion battery typically comprises several solid, secondary electrolytic cells in which the current from each of the cells is accumulated by a conventional current collector, so that the total current generated by the battery is roughly the sum of the current generated from each of the individual electrolytic cells employed in the battery. In lithium ion batteries it is common to stack separate electrolyte cells to create the battery.

There is a trend to commercially develop "bi-cells", in which a single central electrode has two counter electrodes, one positioned on either side of the central electrode. The central electrode has been an anode, the counter electrodes have been cathodes. Bi-cells are more complex than standard cells, and require the successful lamination of more layers.

A bi-cell 201, for example that shown in FIG. 2a, includes, sequentially, a first counter electrode 214a having a first medially positioned current collector 215a, a first separator 212a, a central electrode 210 having a centrally located current collector 215a, a second separator 212b, and a second counter electrode 214b having a second medially positioned current collector 215a. An electrode tab (not shown) connects the central electrode elements to the exterior of the package. A similar counter electrode tab (not shown) connects the counter electrode elements to the exterior of the package.

Lamination has been, and continues to be, a problem in the preparation of polymer batteries. FIG. 2b shows an exploded graphic representation of the interface between at a current collector. The current collectors used are grids or perforated sheets 255, which permit a direct contact interface region 248 between two sheets of polymer electrode 253a, 253b. This electrode-electrode contact across the perforated current collector has proven to be critical in producing bi-cells which resist delamination during use.

It is preferred that a battery achieve the maximum energy potential and cycle life. It would therefore be preferred that the current collector in the anodic and cathodic electrode be positioned to provide optimum battery performance.

SUMMARY OF THE INVENTION

It has been unexpectedly discovered that the placement of the current collector within the counter electrodes can affect the electrochemical properties of the electrolytic cell. The positioning of the current collector within the counter electrode can be varied as desired within the outer half of the counter electrode. Improved battery performance is achieved in a bi-cell battery when the current collector of the counter electrodes are not positioned medially within the electrode, as with the prior art, or within the inner half, but are placed toward the outside of the counter electrodes, i.e., further removed from the central electrode. Optimally, current collectors are positioned at the outermost edges of the two counter electrodes.

Counter electrode materials are preferably attached to another film of similar material through the perforated current collector. When some percentage of the counter electrode material is external to the current collector, the counter electrode bonds to itself through the current collector grid. An optimal placement of the current collector in the counter electrode is at the outermost edge of a counter electrode, with 100% of the electrode material between the current collector and the central electrode. However, if all of the counter electrode is at one side of the current collector with no material at the opposite side of the current collector to which to bond during lamination, the counter electrode tends to delamninate relatively quickly, destroying battery life.

It has been discovered that providing an electrochemically inactive polymer matrix film of material similar to the electrode material distal to the current collector, to which the counter electrode material can adhere, provides both optimal positioning of the current collector within the counter electrode, and minimizes delamination of the counter electrode during battery use. This polymer matrix is a terminal film which provides improved lamination and battery life, but which does not provide electrochemical activity to the bi-cell. Film which is a polymer matrix similar to the electrode film, but which does not contain electrode active materials, is preferred. An excellent choice for this terminal film is polymer matrix separator film.

BRIEF DESCRIPTION OF THE DRAWINGS

FIG. 3 shows a cross-sectional view of an anode-out bi-cell, including first and second anodes, first and second separators, and central cathode.

The Figures drawn for clarity and are not drawn to scale. Similar numbers refer to similar structures.

DETAILED DESCRIPTION OF THE INVENTION

Figure 1:
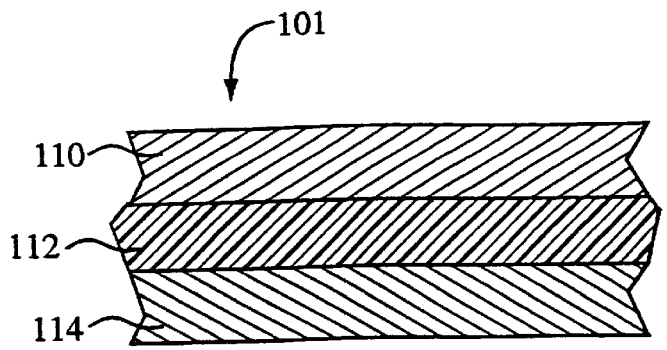
FIG. 1 shows a cross-sectional view of an electrolytic cell, including an electrode, a separator, and a counter electrode.

A traditional polymer matrix electrochemical cell has a negative electrode, a positive electrode, and a separator (generally a polymeric electrolyte film) therebetween. An ion-conducting electrolyte provides ion transfer from one electrode to the other, and commonly permeates the porous structure of each of the electrodes and the separator.

Bi-cells include a central electrode (either cathode or anode), with opposing counter electrodes present on each side of the central electrode, with each counter electrode separated from the central electrode by membrane or separator layers. The bi-cell is laminated under heat and pressure to provide good contact between the battery layers.

As used herein, the term "central electrode" refers to an electrode, either anode or cathode, which is centrally located in an individual bi-cell. The term "counter electrode" refers to an electrode which completes the electrochemical pair with the central electrode. In a bi-cell, there is a single central electrode and two counter electrodes. If the central electrode is an anode, the counter electrodes are cathodic. If the central electrode is a cathode, the counter electrodes are anodic.

Each laminated component of the lithium ion polymer matrix battery herein is generally planar in configuration. The polymer matrix electrodes herein include a generally planar grid or perforated current collector as part of the electrode structure. The general plane of the current collector is paralleled by the general plane of the polymer matrix film portion of the electrode. Similarly, the separator films are largely parallel in orientation to the electrodes. Thus, when the battery is laminated, there is a series of generally planar laminate elements. Those structures which are located at the center of a discrete battery element are described as being "medial" or "medially located" within the element. In contrast, those structures located at the center of the bi-cell as a whole are described as being "central" or "centrally located". For example, the current collector 211 of the central electrode 210 is both medially located within the central electrode and centrally located within the bi-cell. The current collectors 215a, 215b of the counter electrodes 214a, 214b are each medially located within their respective counter electrode, but are each located toward the outer edges of the bi-cell 201.

Those elements which are furthest from the center of the bi-cell, and especially those elements which form the outermost planes of the bi-cell, are described as being "outer" elements, and structures are described as being "toward the outside" of the laminate bi-cell structure. In the embodiment shown in FIG. 2a, for example, the uppermost and lowermost surfaces would be the "outer" surfaces. Each discrete functional layer within the bi-cell similarly includes an "inner" (toward the center of the bi-cell) and an "outer" (toward the outside of the bi-cell) region parallel to the general plane of both the specific discrete element and the bi-cell structure. In each counter electrode, the inner half will be located proximal to the central electrode, and the outer half will be located distal to the central electrode. "Half" refers to approximately 50% by weight of the counter electrode active material.

One of the more difficult parameters in manufacturing polymer matrix batteries is the lamination of the various battery components to form a completed battery. Materials having a similar polymer matrix structure can be laminated together more easily than can dissimilar materials. Lamination of polymer matrix materials to the current collector grids have proven to be particularly problematic. A variety of adhesion promoters and lamination techniques have been tried with varying long-term success. A centrally located current collector within an electrode provides consistent lamination results with polymer matrix to polymer matrix bonding through the current collector grid.

A controlled series of experiments is conducted to determine optimum grid placement in the counter electrodes, as described further in Examples 8 through 11 below. It is determined that grid placement has an impact on battery efficiency.

Each of FIGS. 3a through 3e are labeled with an arrow showing the outside of the bi-cell, for orientation purposes.

As shown in FIG. 3a, grid 315 placement on the inner surface 314i of the counter electrode is possible, sandwiching the grid 315 between the counter electrode 314 and the separator film 312. However, this placement provides poor battery efficiency.

FIG. 3b shows a similar arrangement wherein approximately 25% of the counter electrode 314 is located centrally to the current collector 315, sandwiched between the current collector and the separator film 312. The remaining 75% of the counter electrode is located outside the current collector. This embodiment does not demonstrate improved efficiency when compared to traditional embodiments.

FIG. 3c shows a reciprocal embodiment to that of FIG. 3b. Specifically, approximately 75% of the counter electrode 314 is located centrally to the current collector 315, sandwiched between the current collector and the separator film 312. The remaining 25% of the counter electrode is located outside the current collector. This embodiment demonstrates improved efficiency when compared to traditional embodiments. Additionally, as there is polymer matrix on both sides of the current collector, lamination of the battery assembly is not impaired by the grid placement.

FIG. 3d shows an embodiment in which the current collector 315 is located at the outermost surface 314o of the counter electrode 314. The separator film 312 is located opposite the current collector grid 315. This embodiment provides optimized electrical performance when compared to the embodiments shown in FIGS. 3a–e. Due to the lamination of the electrode polymer matrix on a single side only of the current collector, however, the bi-cell is difficult to laminate and tends to delaminate relatively quickly. Delamination destroys battery function. Therefore, this embodiment optimizes battery efficiency but may compromise battery life.

It has been determined that an embodiment such as that graphically depicted in FIG. 3e provides the benefits of optimized current collector grid placement while providing a battery structure that does not delaminate prematurely.

As shown in FIG. 3e, the preferred embodiment includes a centrally located separator film 312 adjacent the counter electrode 314. The current collector 315 is located on the outer surface 314o of the counter electrode 314. A polymer matrix film 317 is positioned outside the current collector 315 and laminated in position. The polymer matrix material bonds through the current collector grid to the counter electrode material during the lamination process. This embodiment optimizes batter efficiency and life, but results in a somewhat thickened bi-cell structure.

It is preferred that a certain amount of polymer matrix be present outside the current collector in the counter electrodes. If the polymer matrix is electrode material, it will generally be preferred that the amount outside the current collector be minimized within manufacturing parameters. For example, if electrode material is made in sheets having a predetermined thickness, one sheet may be placed outside the current collector, and multiple sheets can be positioned inside the current collector to form the counter electrode. A ratio of 1:2 occurs when one sheet of electrode film is laminated outside the current collector and two sheets of electrode film are laminated central to the current collector. A ratio of 1:3 is shown in FIG. 3c. Ratios of one to four and greater are possible, varying with battery design and functionality parameters. The thickness of the portion of the electrode which is outside the current collector is not critical as long as battery capability and durability requirements are met.

If a polymer matrix film is used outside the current collector of the counter electrodes, the specific thickness of the polymer matrix film is not critical as long as a good laminate bond can be formed. For convenience of manufacturing, the same film which is used as the separator film can be used as the polymer matrix film. This has the advantage of using a material which is already produced for battery use in a new function. It is also advantageous because lamination requirements for separator film are known and can be applied as known in the art.

Figure 2B:
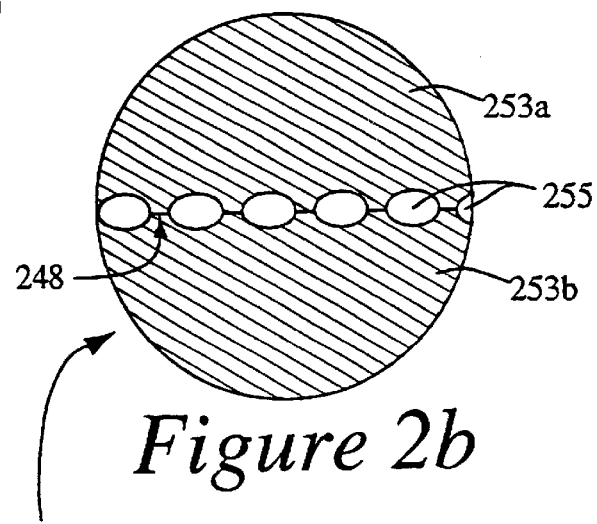
FIG. 2b shows an enlarged view of the interface between two films of a counter electrode material which bond through the gaps of the current collector grid.
Figure 2A:
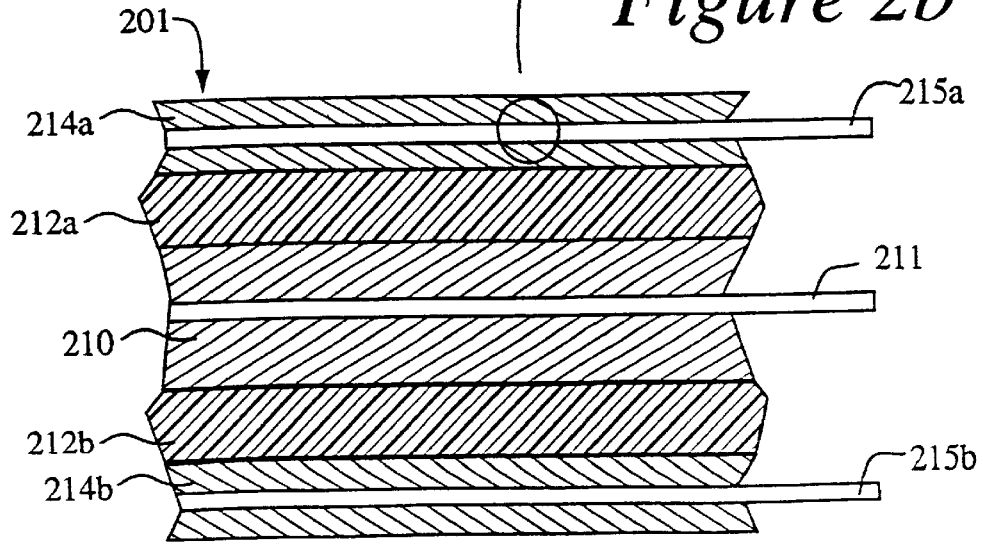
FIG. 2a shows a cross-sectional view of a bi-cell, including first and second counter electrodes, first and second separators, and a central electrode.

In the construction of a lithium ion bi-cell battery such as that shown in cross section in FIG. 2a, a binder material provides a polymeric matrix for each of the central electrode, the separator membranes, and the counter electrodes.

Each of the anodic and cathodic electrodes are formed by similar processes, but include specific anode-active or cathode-active materials in the polymeric binder. That is, a solid polymeric matrix provides part of the structure of the electrode. The preferred separator material is a polymeric matrix film which does not include electrode active materials. Similarly, the preferred polymer matrix film for use when the current collector is located at the extreme edge of a counter electrode is a polymeric matrix film such as that which forms the separator.

Polyvinylidene difluoride (PVdF) and hexafluoropropylene (HFP) copolymers are common binder materials, and are the binder materials which are generally useful in the subject invention. The copolymer generally comprises about 75 to 92% (by weight) of the PVdF, and about 8 to 25% HFP. Preferably, the copolymer comprises about 85 to 90% of the PVdF, and about 10 to 15% HFP. One especially preferred, commercially available copolymer material is KYNAR™ Flex 2801 (Elf Atochem North America, Philadelphia, Pa.), which provides an 88:12 ratio of PVdF:HFP. Inorganic filler adjuncts, such as fumed alumina or fumed silica, are added as desired to provide structural stability to the binder and provide a film having desirable qualities.

A separator membrane may be a commercially available separator made of glass fiber, porous polypropylene or porous polyethylene. Such separators include Type A/E glass fiber filters (Gelman Sciences, Ann Arbor, Mich.), and Celgard (Hoechst-Celanese Corp., N.Y., N.Y.). However, the separator is preferably a solid polymeric matrix, such as the polymeric membrane described above. Such separator membranes are known to the art. Preferred polymeric electrolyte membranes are produced using a casting process in which a carrier liquid is removed to form a flexible sheet. An alternate preferred method produces polymeric electrolyte membranes by extrusion processes. Suitable polymeric electrolyte membranes provide a porous polymer matrix structure, permeated with a plasticizer, upon casting or curing.

A plasticizer is an organic solvent that facilitates the formation of porous polymeric structures. Appropriate plasticizers have high boiling points, typically in the range from about 150° to about 350° C. The plasticizer or plasticizer system must be compatible with the components of the electrochemical cell precursor, it must be processable within design parameters, and it must exhibit low polymer solubility. The plasticizer may be subsequently removed (for example, by extraction) prior to the formation of the activated electrolytic cell.

A variety of plasticizers for processing or activation of the battery precursor are known to the art. Such materials include, for example, ethylene carbonate (EC); ethyl propionate (EP); propylene carbonate (PC); butylene carbonate (BC); vinlyene carbonate (VC); dimethyl adipate (DMA); diethyl carbonate (DEC); dipropylene carbonate (DPC); dibutyl carbonate (DBC); acetates; diesters; oxalates such as dimethyl, succinate, adipate, suberate, and sebacate oxalates; glymes; and low molecular weight polymers such as polycarbonates, polyacrylates, polyesters or polysiloxanes. Other plasticizers include dimethyl, diethyl, dipropyl, dibutyl, and dioctyl adipate. Currently, dibutyl phthalate (DBP) is a preferred plasticizer. Mixtures of such plasticizers can also be used.

An electrode film forming material includes a binder, appropriate electrode active (anode-active or cathode-active) materials, a plasticizing solvent and, if appropriate, a casting solvent. Upon removal of casting solvent from the electrode film forming material, an electrode film is formed. Suitable electrode films provide a flexible sheet having a porous electrode-active structure, permeated with a plasticizer, after solvent casting.

The negative electrode is the anode during discharge. Typical anode active materials are well known in the art, and include, by way of example, intercalation based anodes such as those using carbon or tungsten oxides, and the like. Anode active materials which are appropriate for use within the subject method include lithium intercalation anodes employing carbon materials such as graphite, cokes, mesocarbons, and the like. The anode may also include an electron conducting material such as carbon black.

The anode includes a current collector laminated with the negative electrode material. Materials suitable for anodic current collectors are known to the art, and are usually comprised of an electron conductive material such as metals or alloys. Typical materials include nickel, iron, stainless steel, or copper. Preferably a copper foil sheet, open mesh, expanded metal, woven or non-woven or knitted wire fabric or grid is used. Each current collector is also connected to a current collector tab which extends from the edge of the current collector. In batteries comprising multiple electrochemical cells, the anode tabs are preferably electrically connected together (such as by welding) and connected to a copper or nickel lead. External loads can be electrically connected to the leads. Current collectors and tabs are described in U.S. Pat. Nos. 4,925,752; 5,011,501; and 5,326,653; each of which is incorporated herein. An adhesion promoter can be used to facilitate bonding between the anode material and the anodic current collector.

The positive electrode is the cathode during discharge. Many cathode active materials are known to the art, and include insertion compounds, i.e., any material which functions as a positive pole in a solid electrolytic cell. For lithium ion applications, these are normally characterized as containing all the lithium for the cell. Preferable cathodic materials de-intercalate lithium at a high voltage when contrasted to lithium, making them stable in air. Typical cathodic materials include, by way of example, transition metal oxides, sulfides, and selenides. Such materials include oxides of cobalt, manganese, molybdenum, and vanadium; sulfides of titanium, molybdenum, and niobium; the various chromium oxides; copper oxides; and lithiated oxides of cobalt, manganese and nickel; and the like. Cathodic materials include $LixMn2O4$, $LiCoO2$, $LiNiO2$, $LiCo0.5Ni0.5O2$, and the like.

In a preferred embodiment, the cathodic material is mixed with an electroconductive material such as graphite, powdered carbon, powdered nickel, metal particles, conductive polymers, and the like. The cathode is preferably produced using a polymeric binder to form the positive cathodic film, i.e., a solid polymeric matrix provides part of the structure of the cathode. As with the polymeric electrolyte film/separator, the polymeric binder is formed using both a solid-polymer-forming material and a plasticizer compound.

The cathode includes a current collector laminated with a positive electrode active film material. Materials suitable for cathodic current collectors are known to the art, and are typically comprised of an electron conductive material such as metals or alloys. The cathode current collector is typically of aluminum, stainless steel, and such foils having a protective conductive coating foil. Preferably the cathode current collector is an aluminum foil sheet, open mesh, expanded metal, woven or non-woven or knitted wire fabric or grid. Each current collector is also connected to a current collector tab which extends from the edge of the current collector. In batteries comprising multiple electrochemical cells, the cathode tabs are preferably welded together and connected to a lead. External loads can be electrically connected to the leads. An adhesion promoter can be used to facilitate bonding between the cathode material and the cathodic current collector.

Figure 4:
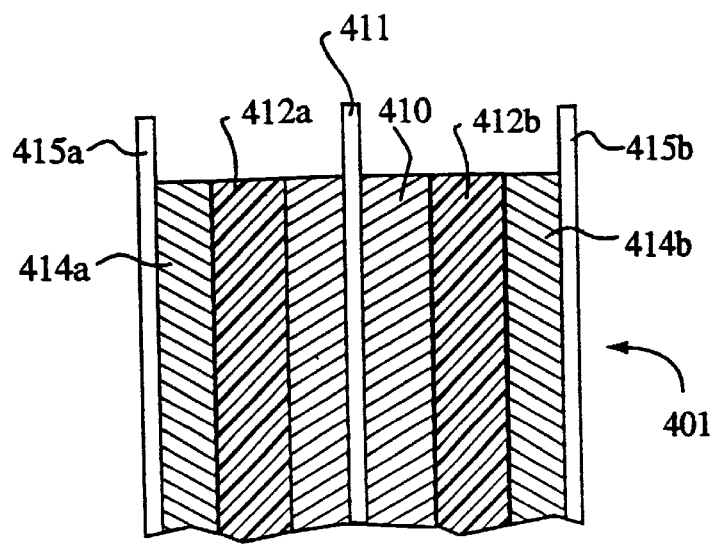
FIG. 4 shows a cross-sectional view of a bi-cell having improved current collector placement in accordance with the invention herein.

An improved structure for a laminate bi-cell battery is shown in FIG. 4. The laminate bi-cell 401 comprising, sequentially, a first counter electrode 414a having a current collector 415a at its outermost surface; a first separator element 412a; a central electrode 410 having a medially positioned current collector 411; a second separator element 412b; and a second counter electrode 414b having a current collector 415b at its outermost surface.

Varying the position of the current collector within the counter electrodes varies the current distribution. It is possible that a position within the inner half of the counter electrode would be desirable. More preferable, however, is to position of the current collector within the outer half of the counter electrode. A preferred embodiment includes the current collector at the extreme outer edge of the counter electrodes. It is preferred, but not required, that the current collectors of the counter electrodes be bilaterally symmetrical, so that the electrochemical processes within the bi-cell is balanced.

Not shown in FIG. 4 are a polymer matrix films external to the current collectors. The polymer matrix film adjacent the current collectors is not required for initial bi-cell function or capacity. However, it may be desirable to use such a film to delay or eliminate delamination and prolong battery life. The necessity of the polymer matrix film adjacent and external to the current collector will be a function of lamination parameters and designed battery life.

The specific embodiment of the bi-cell does not rely on either the anode or the cathode being the central electrode. For example, when the central electrode is anodic, the counter electrodes will be cathodic. Similarly, when the central electrode is cathodic, the counter electrodes will be anodic.

A "dry" electrolytic cell precursor is prepared by assembling an anode, a separator membrane, and a cathode, and extracting plasticizer from each of the layers. Although each of the electrodes and the separator can be individually extracted, it is generally more convenient to laminate or assemble the appropriate layers with the plasticizer intact, and extract the plasticizer from the battery precursor as a unit. Methods for battery precursor preparation and extraction are described in U.S. Pat. No. 5,456,000, which is incorporated herein by reference.

The extracted battery precursor is activated by the addition of a solvent/electrolytic salt solution. The electrolyte solvent is a solvent included in the electrolyte solution for the purpose of solubilizing alkali salts during operation of the electrolytic cell. The electrolyte solvent can be any compatible, electrochemically stable, relatively non-volatile, aprotic, relatively polar solvent. Preferably these materials have boiling points greater than about 85° C. to simplify manufacture and increase the operation range and shelf life of the battery. Typical examples of solvents are dimethyl carbonate (DMC), diethyl carbonate (DEC), propylene carbonate (PC), ethylene carbonate (EC), methyl ethyl carbonate (MEC), gamma-butyrolactone, triglyme, tetraglyme, dimethylsulfoxide, dioxolane, sulfolane, and the like, and mixtures of such materials.

Electrolyte salts are those inorganic salts which are suitable for use in a non-aqueous electrolyte. Particularly useful are alkali salts wherein the cation of the salt is an alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known to the art. For example, $LiPF_6$, $LiSCN$, $LiAsF_6$, $LiClO_4$, $LiN(CF_3SO_2)_2$, $LiBF_4$, $LiCF_3SO_3$, $LiSbF_6$, $NaSCN$, and the like. The electrolyte salt typically comprises from about 5 to about 25 weight percent of the inorganic ion salt based on the total weight of the electrolyte. Preferably, the salt is present in the electrolyte solution from about 10 to 20 weight percent. The weight percent of the salt will vary with the type of salt and upon the specific electrolyte solvent employed, as known to the art.

The laminated battery precursor is generally placed into a moisture-impermeable package, and electrically connected to electrode tabs, prior to activation by the electrolyte solution. Because many electrolyte salts are sensitive to moisture or other chemical compounds, the activation of the electrolytic cell precursor preferably takes place in an inert, moisture-free atmosphere, such as under an argon atmosphere.

The following examples are offered for purposes of demonstration, and not by way of limitation. In each of the batteries produced by the following examples a separator membrane is used as the insulator member. This is for convenience of comparison in the Experimental section, and is not a limitation of the materials which are suitable as the insulator.

EXAMPLE 1

Cathode Current Collector

An aluminum grid used for the anode current collector is a sheet of expanded aluminum metal of about 2.5 g/m$^2$, available (Exmet, Naugatuck, Conn.).

The surface of the aluminum grid is prepared by etching the grid in a series of solutions. Specifically, the aluminum grid is placed into an acetone bath for 5 minutes. It is then rinsed in water for 1 to 2 minutes. The aluminum grid is then dipped in an etch bath solution comprising 56 grams of potassium hydroxide pellets which have been dissolved in 1 L of methanol. The aluminum grid is removed from the etch solution after 8 minutes, and placed in a fresh water bath for 8 minutes, followed by an acetone bath for 3 minutes.

An adhesion promoter layer is prepared as a dispersed colloidal solution. A grid coating is formed by adding 100 parts (by weight) ethanol, 100 parts Morton Adcote 50C12, and 5 parts SUPER-P™ (M.M.M. Carbon, Willebrock, Belgium) into a ball mix jar, and mixed for one hour. The dispersed colloidal solution is diluted in 100 parts ethanol and spray coated onto the etched aluminum grid.

EXAMPLE 2

Control Cathode Structure

A cathode structure having a medially placed current collector is prepared.

A polymer/cathode mixture is prepared by mixing 10 parts by weight of KYNAR™ Flex 2801 (a copolymer of PVdF and HFP) (Elf Atochem, Philadelphia, Pa.), 65 parts by weight O25C (Li$_x$Mn$_2$O$_4$) (Kerr-McGee), and 5 parts of SUPER-P™ carbon black. The material is mixed for 24 hours in a ball milling jar.

To the dry, powdery cathode active mix is added 20 parts of dibutyl phthalate (DBP). The wetted material is mixed under high shear for ten to thirty minutes, until a homogeneous mixture is formed. A blender maintained at a temperature of 130° C. is appropriate for the mixing.

Two cathode sheets, each having a thickness of 125 µm, are formed by hot pressing at 130° C. for 30 seconds on an appropriate substrate. A current collector of Example 1 is placed on the upper surface of the first cathode sheet. A second cathode sheet is then placed on the upper surface of the current collector. Pressure is applied to the resultant three-layer structure, to provide good contact between the layers, and the structure is hot-pressed at 130° C. for 15 to 30 seconds to form a cathode structure.

EXAMPLE 3

Improved Cathode Structure

A cathode structure having a current collector at one edge is prepared.

The procedure of Example 2 is repeated to form two cathode sheets. The cathode sheets are layered together, and a current collector of Example 1 is placed on top of the two sheet strata. Pressure is applied to the resultant three-layer structure, to provide good contact between the layers, and the structure is hot-pressed at 130° C. for 15 to 30 seconds to form a cathode structure. The cathode structure has a double thickness of cathode film with a current collector at one edge.

EXAMPLE 4

Anode Current Collector

A copper grid used for the anode current collector is a sheet of expanded copper metal about 50 µm thick. It is available under the designation 2Cu5–155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (70 ml 70% nitric acid and 1 L of water). The copper grid is removed from the etch solution after 5 minutes, and placed in a fresh water bath for 8 minutes, followed by an acetone bath for 3 minutes.

An adhesion promoter layer is prepared as described above, and spray coated onto the etched copper grid.

EXAMPLE 5

Control Anode Structure

An anode structure having a medially placed current collector is prepared.

A polymer mixture is prepared by placing 12 parts of PVdF:HFP copolymer (KYNAR™ Flex 2801) with 60 parts of BG34 (Superior Graphite, Bloomingdale, Ill.) into a ball mill jar and mixing for 24 hours. This produces a dry, powdery mix in which the particles are well-mixed and of small size.

To the dry, powdery mix is added 30 parts of dibutyl phthalate (DBP). The wetted material is mixed under elevated temperature (130° C.) and high shear conditions, such as in a blender, for ten to thirty minutes or more, until a homogeneous mixture is formed.

Anode sheets are formed by hot pressing the anode material at 130° C. for 30 seconds on an appropriate substrate. A current collector of Example 3 is placed on the upper surface of a single anode sheet. A second anode sheet is used to cover the current collector, and pressure is applied to the resultant structure. To provide good contact between the layers, it is laminated at 120° C. with a hot roll laminator or hot press to form an anode structure.

EXAMPLE 6

Improved Anode Structure

An anode structure having a current collector at one edge is formed.

Anode sheets are formed by hot pressing anode material at 130° C. for 30 seconds on an appropriate substrate. Two anode sheets are layered together, and a current collector of Example 3 is placed on the upper surface. Pressure is applied to the resultant structure. To provide good contact between the layers, it is laminated at 120° C. with a hot roll laminator or hot press to form an anode structure.

EXAMPLE 7

Separator 20 parts of treated fumed silica and 30 parts of KYNAR™ Flex 2801 are placed into a ball mill jar and mixed for 24 hours. This produces a dry, powdery mix in which the particles are well-mixed.

To the dry, powdery mix is added 55 parts of dibutyl phthalate (DBP). The wetted material is mixed under low shear for five to ten minutes, until a homogeneous mixture is formed.

The resultant mixture is hot-pressed at 130° C. for 30 seconds to form a strong, clear film having a thickness of about 2 mil.

EXAMPLE 8

Preparation of Mixed Cathode Bi-Cell Precursor

A solid electrochemical cell precursor is formed by laminating a first cathode counter electrode of Example 2 (a control cathode of the prior art), adjacent a first polymeric separator film of Example 7, and laminating a second cathode counter electrode of Example 3 (a current collector out cathode), adjacent a second polymeric separator film of Example 7, with the current collector oriented outward. The two cathodic counter electrodes are closely matched for weight. A central anodic electrode of Example 5 is positioned between the two polymeric separator films of the two counter electrode structures, and the unit is laminated together.

Figure 5:
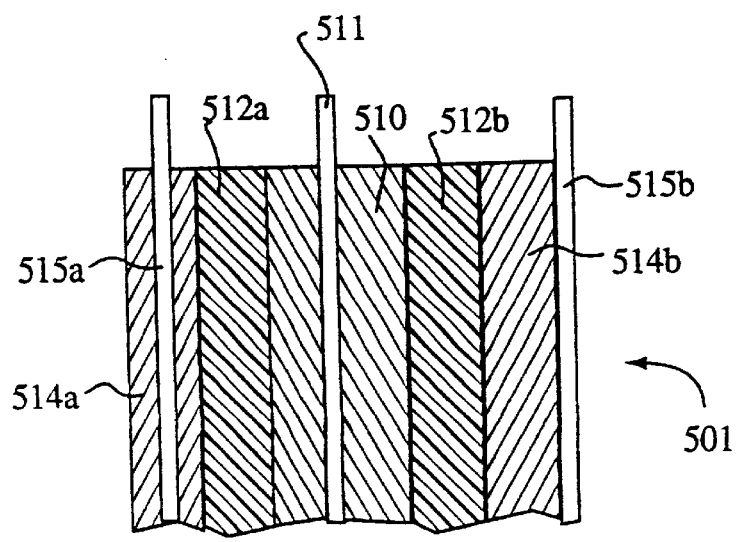
FIG. 5 graphically represents a testing embodiment of a bi-cell, in which a prior art counter electrode and an improved counter electrode of the subject invention are simultaneously and competitively tested for charge and discharge.

The layers are positioned as shown in FIG. 5 to form a bi-cell precursor 501. Sequentially, they are: the first (control) cathodic counter electrode 514a having a centrally located current collector 515a; a first separator 512a; the central anodic electrode 510; a second separator 512b; and the second (improved) cathodic counter electrode 514b having a current collector 515b at its outermost edge. The layers are heated under pressure to form a bi-cell precursor. The wt:wt ratio of cathode to anode in the completed bi-cell is 2.5:1.

The bi-cell is extracted, activated, and packaged as follows: The bi-cell precursor is immersed in a bath of methanol or diethyl ether or in a series of methanol or ether baths, to remove the plasticizer. Preferably, the methanol or ether bath(s) provide at least 30 minutes of contact with an excess of methanol or ether.

The extracted battery precursor is vacuum dried overnight at 40° C. An electrolyte solvent is prepared by combining 267 parts of ethylene carbonate and 133 parts of dimethyl carbonate. To the electrolyte solvent is added 60 parts of $LiPF_6$ to form an electrolyte solvent solution. The electrolyte solvent solution is added to the bi-cell precursor. The activated electrolytic cell is packaged under vacuum in a rigid housing. Positive and negative electrode tabs extend from the packaging. The battery is charged to 4.2V.

EXAMPLE 9

Experimental and Results

The two cathodic counter electrodes are tabbed separately to allow the current distribution in the individual electrodes to be monitored. Current distribution is assessed during normal constant current cycling of the cell.

Figure 6:
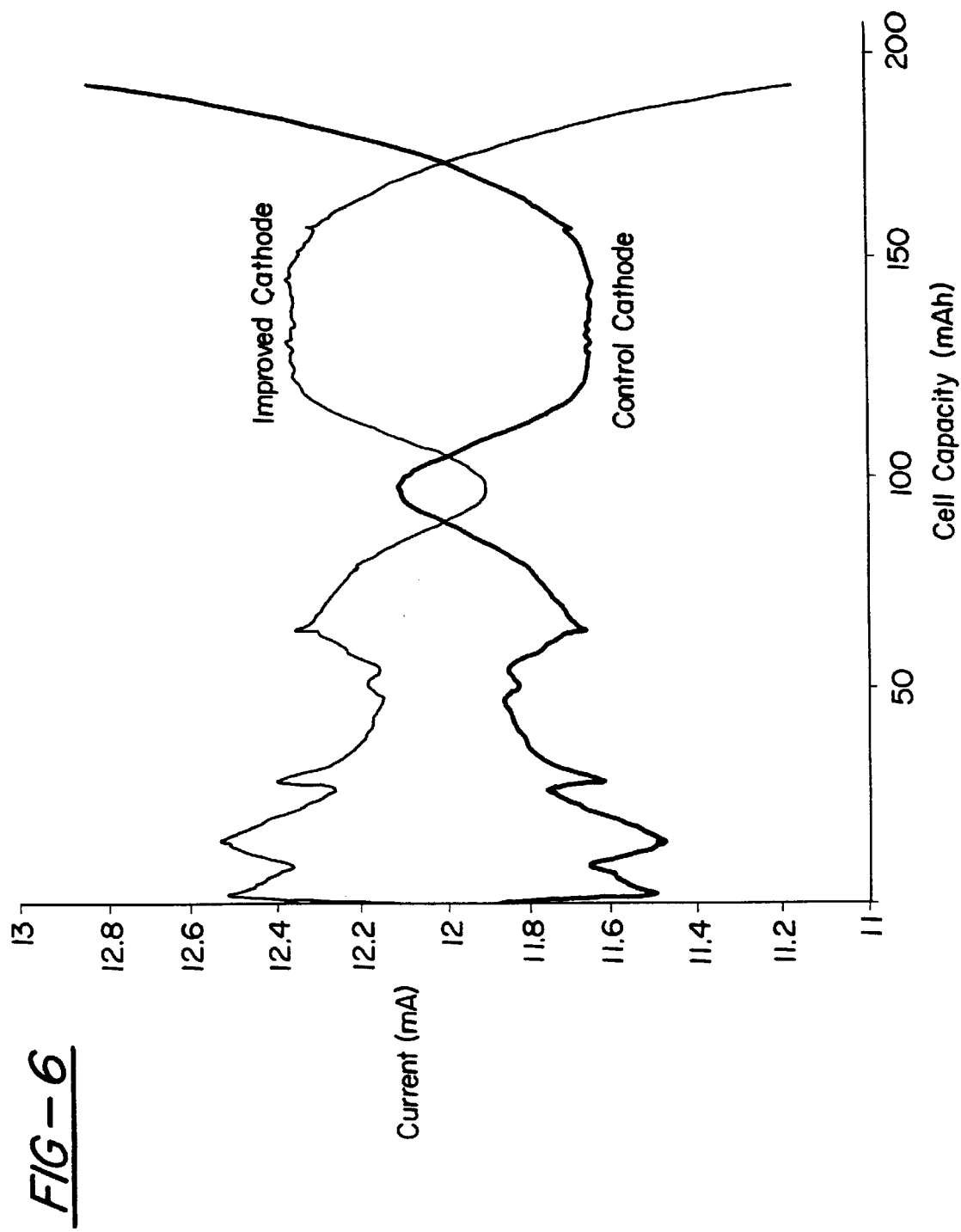
FIGS. 6 and 7 show results obtained when the counter electrodes are cathodic, during charge and discharge, respectively.

A graph of the competing cathodic counter electrodes during charging of the bi-cell is shown in FIG. 6.

Figure 7:
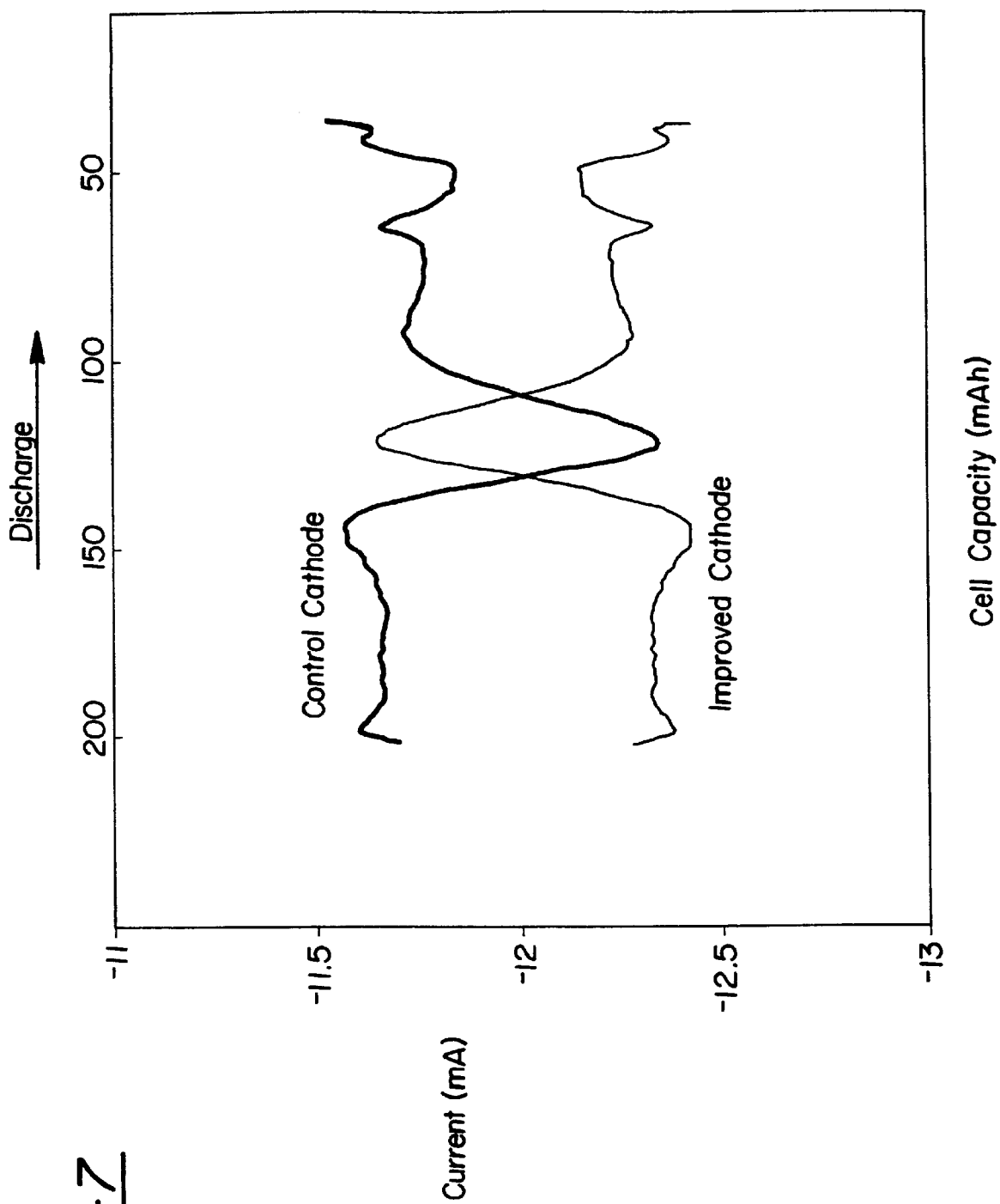

A graph of the competing cathodic counter electrodes during discharge of the bi-cell is shown in FIG. 7.

Data is shown as a function of cell capacity for both charge and discharge. The cells are cycled at a current density of $0.5 mA/cm^2$ (i.e., 24 mA total) between 3 and 4.2 V at 23° C.

During both charge and discharge the improved (current collector out) cathode performs more efficiently, that is, it draws proportionately more current in competition with the current collector medial cathode.

During initial cell charge (FIG. 6) the current is preferentially being pulled from the traditional cathodic counter electrode. It is only toward the end of cell charge (when the current collector out cathodic counter electrode is presumably nearing lithium exhaustion) that the traditional cathodic counter electrode begins to catch up and out-perform the improved cathodic counter electrode.

During cell discharge (FIG. 7) a similar pattern emerges with the improved design cathodic counter electrode again performing more efficiently. Note that on this figure the currents are denoted as negative values, reflecting the discharge reaction.

EXAMPLE 10

Preparation of Mixed Anode Bi-Cell Precursor

A solid electrochemical cell precursor is formed by laminating a first anodic counter electrode of Example 5 (a control anode of the prior art), adjacent a first polymeric separator film of Example 7, and laminating a second anodic counter electrode of Example 6 (a current collector out anode), adjacent a second polymeric separator film of Example 7, with the current collector oriented outward. The two anodic counter electrodes are closely matched for weight. A central cathodic electrode of Example 2 is positioned between the two polymeric separator films of the two counter electrode structures, and the unit is laminated together.

The layers are positioned as shown in FIG. 5 to form a bi-cell precursor 501. Sequentially, they are: the first (control) anodic counter electrode 514a having a centrally located current collector 515a; a first separator 512a; the central cathodic electrode 510; a second separator 512b; and the second (improved) anodic counter electrode 514b having a current collector 515b at its outermost edge. The layers are heated under pressure to form a bi-cell precursor. The wt:wt ratio of cathode to anode in the completed bi-cell is 2.5:1.

The bi-cell is extracted, activated, and packaged as described above in Example 8.

EXAMPLE 11

Experimental and Results

The two anodic counter electrodes are tabbed separately to allow the current distribution in the individual electrodes to be monitored. Current distribution is assessed during normal constant current cycling of the cell.

Figure 8:
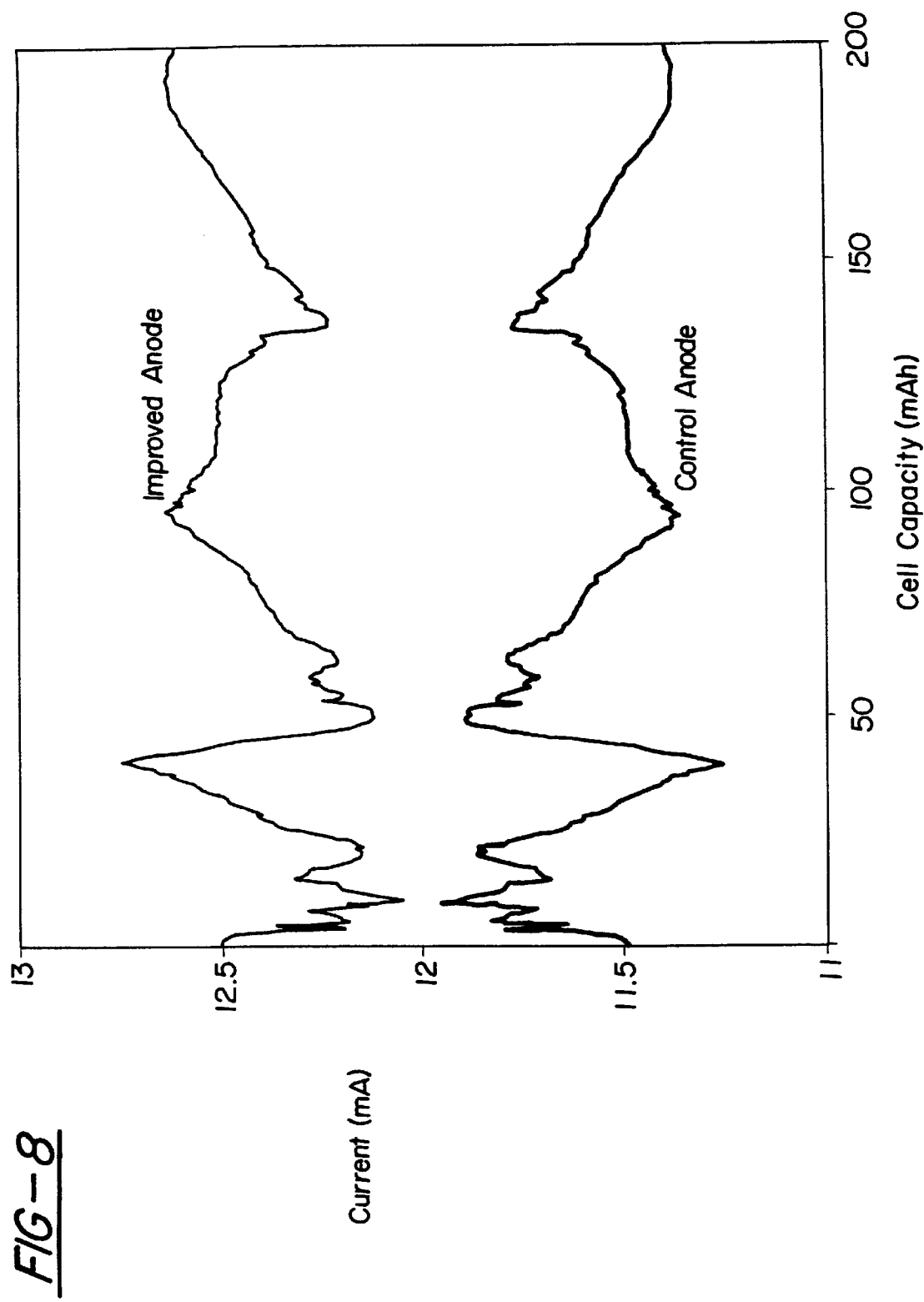
FIGS. 8 and 9 show results obtained when the counter electrodes are anodic, during charge and discharge, respectively.

A graph of the competing anodic counter electrodes during charging of the bi-cell is shown in FIG. 8.

Figure 9:
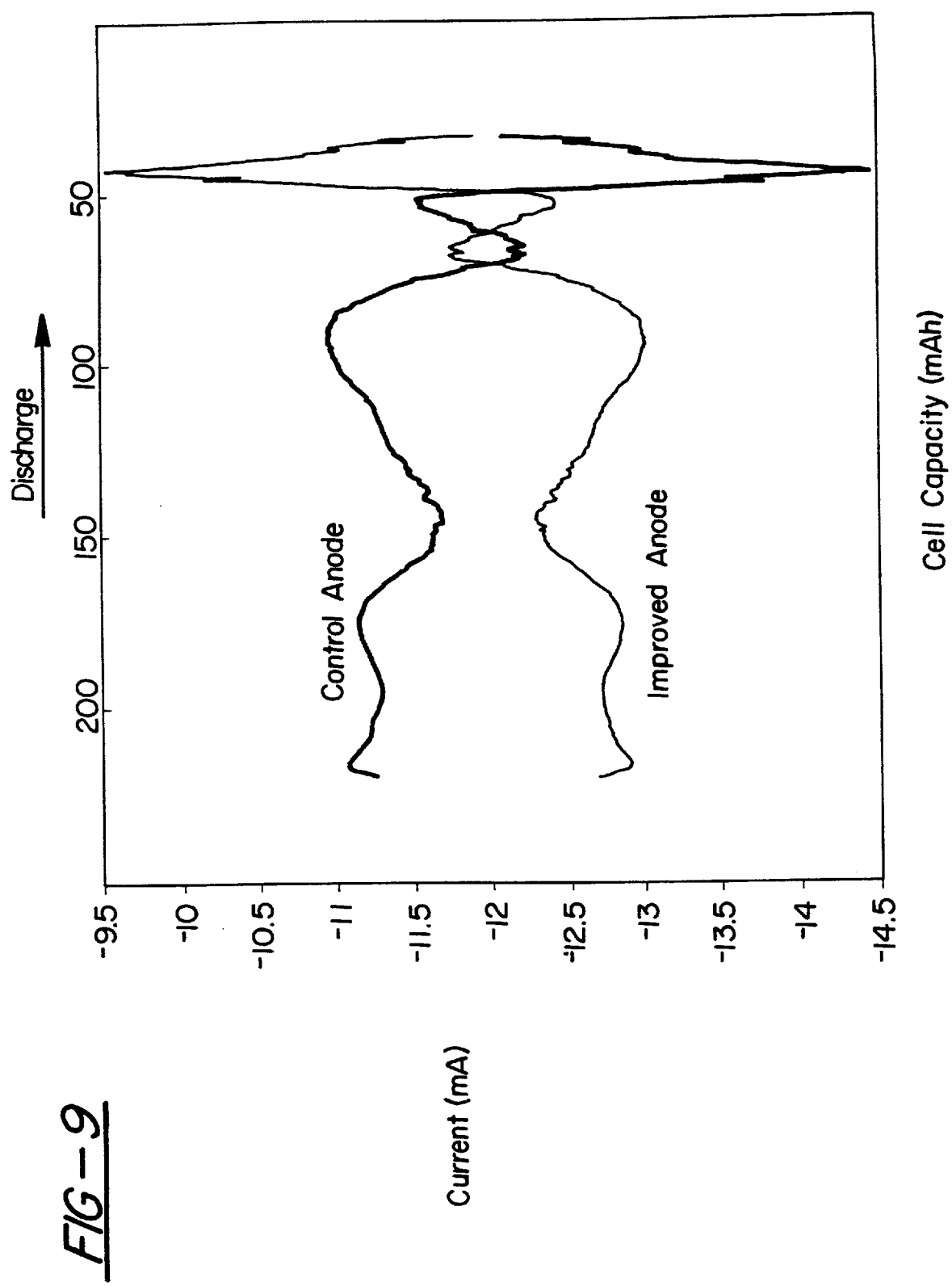

A graph of the competing anodic counter electrodes during discharge of the bi-cell is shown in FIG. 9.

Data is shown as a function of cell capacity for both charge and discharge. The cells are cycled at a current density of 0.5mA/cm$^2$ (i.e., 24 mA total) between 3 and 4.2 V at 23° C.

During both charge and discharge the improved (current collector out) anode performs more efficiently, that is, it draws proportionately more current in competition with the current collector medial anode. Throughout the cell charging process the improved anode apparently pulls more current (and thus ultimately attains a higher level of lithium ion concentration when the cell is fully charged). During the subsequent cell discharge process (FIG. 9), the improved anodic counter electrode again appears more efficient, although this may simply reflect the higher initial specific capacity in this anodic counter electrode attained during the charging process.

During initial cell charge (FIG. 8) the current is preferentially being pulled from the traditional anodic counter electrode. It is only toward the end of cell charge that the traditional anodic counter electrode begins to catch up and out-perform the improved anodic counter electrode.

During cell discharge (FIG. 9) a similar pattern emerges with the improved design anodic counter electrode again performing more efficiently. Note that on this figure the currents are denoted as negative values, reflecting the discharge reaction.

EXAMPLE 12

Alternate Mixed Cathode Bi-Cell Precursor

A solid electrochemical cell precursor is formed as described in Example 8, substituting for the second counter electrode a cathodic counter electrode having a current collector at the outermost edge of the cathodic material, and a polymer matrix film next to the current collector. The layers are heated under pressure to form a bi-cell precursor. The bi-cell is extracted, activated, and packaged as described in Example 8.

The two cathodic counter electrodes are tabbed separately to allow the current distribution in the individual electrodes to be monitored. Current distribution is assessed during normal constant current cycling of the cell. The cells are cycled at a current density of 0.5mA/cm$^2$ (i.e., 24 mA total) between 3 and 4.2 V at 23° C.

During both charge and discharge the improved cathode comprising cathodic material-current collector-polymer matrix film performs more efficiently than the current collector medial cathode.

EXAMPLE 13

Alternate Mixed Cathode Bi-Cell Precursor

A solid electrochemical cell precursor is formed as described in Example 8, substituting for the second counter electrode a cathodic counter electrode having a current collector at the innermost edge of the cathodic material. The layers are heated under pressure to form a bi-cell precursor. The bi-cell is extracted, activated, and packaged as described in Example 8.

The two cathodic counter electrodes are tabbed separately to allow the current distribution in the individual electrodes to be monitored. Current distribution is assessed during normal constant current cycling of the cell. The cells are cycled at a current density of 0.5mA/cm$^2$ (i.e., 24 mA total) between 3 and 4.2 V at 23° C.

During both charge and discharge the current-collector-central cathode performs somewhat less efficiently than the current collector medial cathode.

EXAMPLE 14

Alternate Mixed Anode Bi-Cell Precursor

A solid electrochemical cell precursor is formed as described in Example 10, substituting for the second counter electrode an anodic counter electrode having a current collector at the outermost edge of the anodic material, and a polymer matrix film next to the current collector. The layers are heated under pressure to form a bi-cell precursor. The bi-cell is extracted, activated, and packaged as described in Example 10.

The two anodic counter electrodes are tabbed separately to allow the current distribution in the individual electrodes to be monitored. Current distribution is assessed during normal constant current cycling of the cell as described in Example 11. During both charge and discharge the improved (current collector out) anode performs more efficiently than the current collector medial anode.

EXAMPLE 15

Alternate Mixed Anode Bi-Cell Precursor

A solid electrochemical cell precursor is formed as described in Example 10, substituting for the second counter electrode an anodic counter electrode having a current collector at the innermost edge of the anodic material. The layers are heated under pressure to form a bi-cell precursor. The bi-cell is extracted, activated, and packaged as described in Example 10.

The two anodic counter electrodes are tabbed separately and tested as described in Example 11. During both charge and discharge the current-collector-central anode performs somewhat less efficiently than the current collector medial anode.

All percentages are weight/weight percent, unless noted otherwise. When a range of values is given to be "about" a certain percentage, each of the upper and lower ranges can be varied by 5 to 10 percent if such variation does not cause detrimental function to the system.

While the invention has been described in connection with several exemplary embodiments, it will be understood that many modifications will be apparent to those of ordinary skill in the art in light of the above disclosure. Reference to the following claims should be made to determine the scope of the claimed invention.

We claim:

1. An improved structure for a laminate bi-cell battery, said laminate bi-cell comprising, sequentially,
   (i) a first counter electrode;
   (ii) a first separator element;
   (iii) a central electrode;
   (iv) a second separator element; and
   (v) a second counter electrode;
   wherein at least one of said first and second counter electrodes includes a current collector which is not medially positioned.

2. An improved bi-cell of claim 1 wherein at least one of said first and second counter electrodes includes a current collector which is positioned within the outer half of the counter electrode.

3. An improved bi-cell of claim 1 wherein said first counter electrode and said second counter electrode each includes an inner surface and an outer surface, and wherein at least one of said first counter electrode and said second counter electrode includes a current collector which is positioned at the outer surface of the counter electrode.

4. An improved bi-cell of claim 3 wherein each of said first counter electrode and said second counter electrode includes a current collector which is positioned at the outer surface of the counter electrode.

5. An improved bi-cell of claim 4 further comprising an electrochemically inert polymer matrix film adjacent to and outside of the current collector.

6. An improved bi-cell of claim 5 wherein said electrochemically inert polymer matrix film is a PVdF:HFP copolymer.

7. An improved bi-cell of claim 1 further comprising at least two bi-cells electrically connected to form a battery.

8. An improved bi-cell of claim 1 wherein said first counter electrode and said second counter electrode are anodic, and said central electrode is cathodic.

9. An improved bi-cell of claim 1 wherein said first counter electrode and said second counter electrode are cathodic, and said central electrode is anodic.

10. An improved structure for a laminate bi-cell battery, said bi-cell comprising, sequentially,
  (i) a first counter electrode having an inner half located proximal to a central electrode and an outer half located distal to the central electrode;
  (ii) a first separator element;
  (iii) a central electrode;
  (iv) a second separator element; and
  (v) a second counter electrode having an inner half located proximal to the central electrode and an outer half located distal to the central electrode;
wherein at least one of said first and second counter electrodes includes a current collector which is located in the outer half of said at least one counter electrode.

11. An improved bi-cell of claim 10 wherein each of said first counter electrode and said second counter electrode includes a current collector which is positioned within the outer half of the counter electrode.

12. An improved bi-cell of claim 10 wherein said first counter electrode and said second counter electrode each includes an inner surface and an outer surface, and wherein at least one of said first counter electrode and said second counter electrode includes a current collector which is positioned at the outer surface of the counter electrode.

13. An improved bi-cell of claim 12 wherein each of said first counter electrode and said second counter electrode includes a current collector which is positioned at the outer surface of the counter electrode.

14. An improved bi-cell of claim 13 further comprising an electrochemically inert polymer matrix film laminated adjacent to and outside of the current collector.

15. An improved bi-cell of claim 14 wherein said electrochemically inert polymer matrix film is a PVdF:HFP copolymer.

16. An improved bi-cell of claim 10 further comprising at least two bi-cells electrically connected to form a battery.

17. An improved bi-cell of claim 10 wherein said first counter electrode and said second counter electrode are anodic, and said central electrode is cathodic.

18. An improved bi-cell of claim 10 wherein said first counter electrode and said second counter electrode are cathodic, and said central electrode is anodic.

19. An improved structure for bi-cell batteries comprising, sequentially:
  (i) a first counter electrode;
  (ii) a first separator element;
  (iii) a central electrode comprising, sequentially, a first central electrode film, a central electrode current collector, and a second central electrode film;
  (iv) a second separator element; and
  (v) a second counter electrode;
wherein at least one of said first counter electrode and said second counter electrode comprises, sequentially, an inner counter electrode film, a counter electrode current collector, and an outer counter electrode film; and wherein said inner counter electrode film comprises an active material mass which is greater than the active material mass of said outer counter electrode film.

20. The structure of claim 19 wherein, on the basis of 100 parts by weight of counter electrode active material mass, said inner counter electrode film constitutes at least 75 parts by weight and said outer counter electrode film constitutes the balance.

21. The structure of claim 19 wherein, on the basis of 100 parts by weight of counter electrode active material mass, said inner counter electrode film constitutes at least 80 parts by weight and said outer counter electrode film constitutes the balance.

22. The stricture of claim 19 wherein said first counter electrode and said second counter electrode are anodic, and said central electrode is cathodic.

23. The structure of claim 19 wherein said first counter electrode and said second counter electrode are cathodic, and said central electrode is anodic.

24. An improved structure for a bi-cell battery comprising, sequentially:
  (i) a first counter electrode;
  (ii) a first separator element;
  (iii) a central electrode;
  (iv) a second separator element; and
  (v) a second counter electrode; and wherein at least one of said first and second counter electrodes includes an inner surface, an outer surface and a mass of active material and wherein more than 50% of said active material mass is positioned between said inner surface and said current collector and the balance of said active material mass is positioned at the outer surface of said counter electrode.

25. The structure of claim 24 wherein at least 75% of said active material mass is positioned between said inner surface and said current collector.

* * * * *